(12) United States Patent
Whittier

(10) Patent No.: US 7,317,962 B2
(45) Date of Patent: Jan. 8, 2008

(54) METHODS AND APPARATUS FOR MANAGING INFORMATION RELATED TO RECYCLABLE CONTAINERS

(75) Inventor: Frank Whittier, Portland, ME (US)

(73) Assignee: Count & Crush, LLC, South Portland, ME (US)

( * ) Notice: Subject to any disclaimer, the term of this patent is extended or adjusted under 35 U.S.C. 154(b) by 309 days.

(21) Appl. No.: 11/042,956

(22) Filed: Jan. 25, 2005

(65) Prior Publication Data

US 2006/0167580 A1    Jul. 27, 2006

(51) Int. Cl.
*G06F 19/00*    (2006.01)
(52) U.S. Cl. .............. 700/116; 705/1; 705/28
(58) Field of Classification Search ........... 700/116; 705/1, 28
See application file for complete search history.

(56) References Cited

U.S. PATENT DOCUMENTS

| | | | |
|---|---|---|---|
| 4,829,428 A * | 5/1989 | Weitzman et al. ............ | 705/28 |
| 5,248,102 A | 9/1993 | Bohn | |
| 5,249,689 A | 10/1993 | Wergeland et al. | |
| 5,251,546 A | 10/1993 | Wergeland et al. | |
| 5,462,153 A | 10/1995 | Friis | |
| 5,464,976 A | 11/1995 | Scofield et al. | |
| 5,484,995 A | 1/1996 | Scofield et al. | |
| 5,522,311 A | 6/1996 | Horsrud et al. | |
| 5,559,319 A | 9/1996 | Peng | |
| 5,614,706 A | 3/1997 | Bard et al. | |
| 5,628,408 A | 5/1997 | Planke et al. | |
| 5,860,503 A | 1/1999 | Hanserud et al. | |
| 5,934,440 A | 8/1999 | Kroghrud | |
| 5,960,402 A * | 9/1999 | Embutsu et al. ............ | 705/1 |
| 6,006,995 A | 12/1999 | Amundsen et al. | |
| 6,637,657 B2 | 10/2003 | Barkau et al. | |
| 6,648,227 B2 | 11/2003 | Swartz et al. | |
| 2003/0215260 A1 | 11/2003 | Morii et al. | |

FOREIGN PATENT DOCUMENTS

| | | |
|---|---|---|
| EP | 0 389 735 A1 | 10/1990 |
| EP | 1 247 583 A1 | 10/2002 |
| GB | 2 330 409 A | 4/1999 |
| WO | WO 00/44508 A2 | 8/2000 |
| WO | WO 02/089073 A2 | 11/2002 |

OTHER PUBLICATIONS

International Search Report and Written Opinion for International Application PCT/US2006/002425 dated Jun. 7, 2006.

(Continued)

*Primary Examiner*—Kidest Bahta
*Assistant Examiner*—Sheela Rao
(74) *Attorney, Agent, or Firm*—Wolf Greenfield & Sacks, P.C.

(57) ABSTRACT

Methods and apparatus are provided for managing information related to recyclable containers. In one embodiment, an assembly is provided which comprises an intake port, a plurality of densification devices each configured to density a recyclable container, a computer-readable medium on which is stored container information, a scanning device for determining a characteristic of the container, and a processor which selects one of the plurality of densification devices to which the recyclable container should be conveyed based on the characteristic determined by the scanning device.

20 Claims, 11 Drawing Sheets

OTHER PUBLICATIONS

International Search Report and Written Opinion for International Application PCT/US2006/002128 dated May 23, 2006.

Tomra, "First Tomra Recycling Center Now Open in the U.K," News 2005/Jan. 2005, pp. 1-2 http://www.tomra.com/default.asp?V_DOC_ID=1341.

Tomra, "Recycling Centers," Products/Recycling Centers/Tomra Recycling Center, pp. 1-2 http://www.tomra.com/default.asp?V_DOC_ID=1341.

Tomra, "Tomra Newsletter," Summer 2004, Tomra Systems ASA-Spring/Summer 2004, pp. 1, http://www.tomra.com/default.asp?V_DOC_ID=1341.

Tomra, "Return, Recycling News From Tomra, Introducing: The Tomra Recycling Center," Summer 2004, pp. 1-22.

Tomra, "Tomra Newsletter," Tomra Systems ASA-Tomra Newsletter, pp. 1, http://www.tomra.com/default.asp?V_DOC_ID=1341.

Tomra, "Return, Recycling News From Tomra, Cutting the Cord Tomra RVMs on the Airwaves," Winter, 2004, pp. 1-27.

* cited by examiner

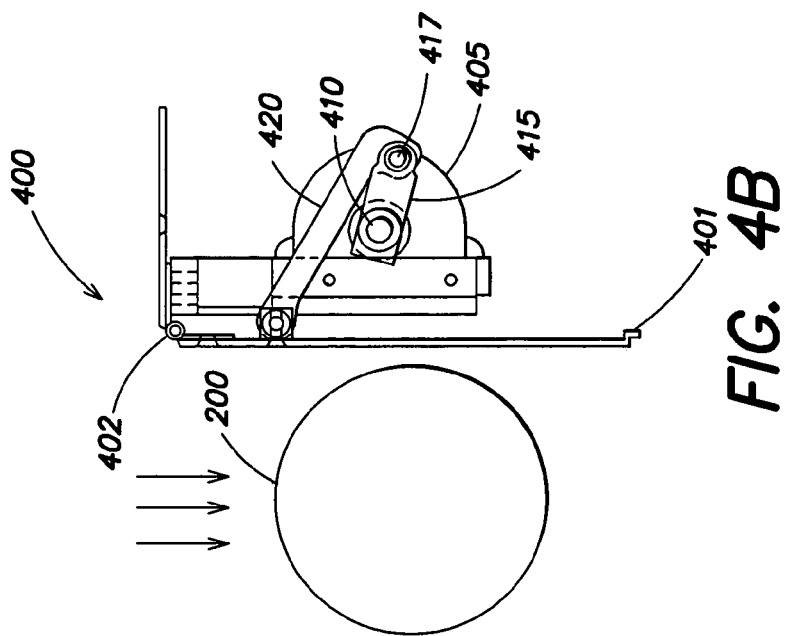
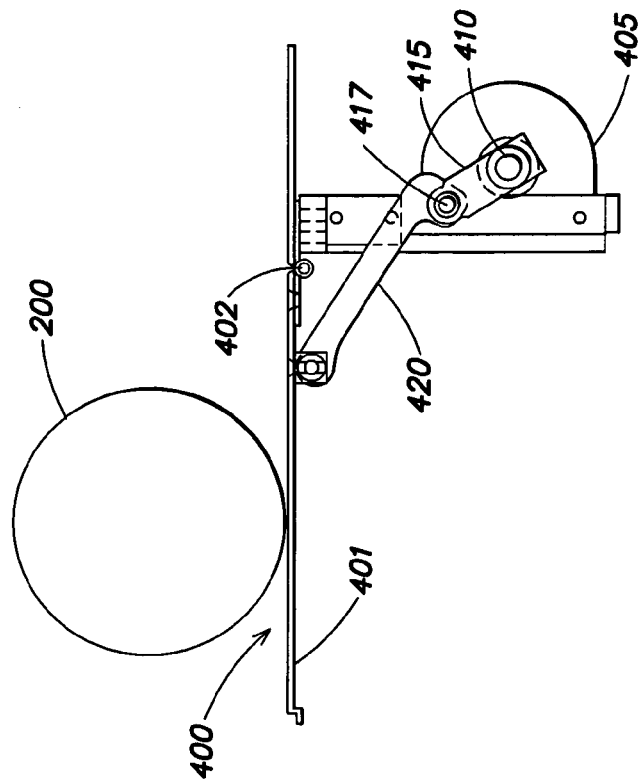
FIG. 4A
FIG. 4B

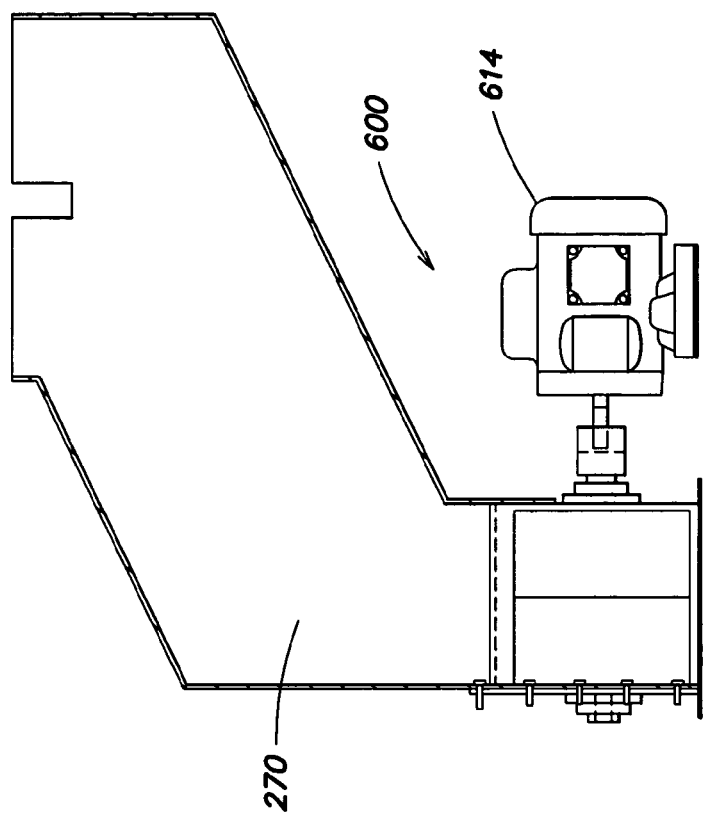
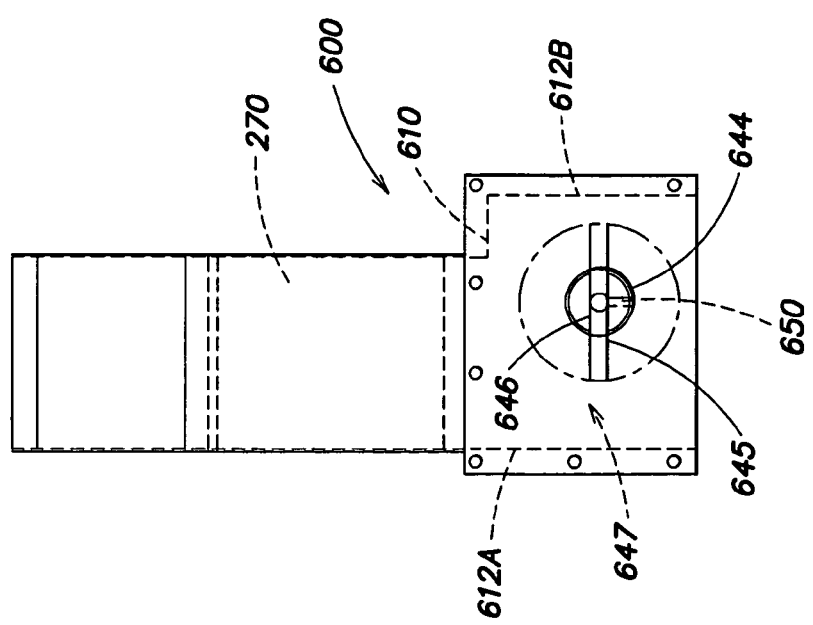
FIG. 6B
FIG. 6A

METHODS AND APPARATUS FOR MANAGING INFORMATION RELATED TO RECYCLABLE CONTAINERS

FIELD OF INVENTION

This invention relates to methods and apparatus used for materials handling, and more particularly to methods and apparatus for handling recyclable containers.

BACKGROUND OF INVENTION

Many states impose a cash deposit on beverage containers purchased by consumers to minimize litter and encourage recycling. For example, a number of states impose deposits of up to fifteen cents for each can, bottle and/or other container sold. Typically, after a consumer consumes the beverage stored in the container, the consumer presents the container at a return center (e.g., at a supermarket or standalone redemption center) for return of the deposit. The return center may subject the container to a recycling process through which the container is destroyed, so that the material from which the container is formed may be recovered for reuse. Containers may be formed of any of numerous materials, such as glass, plastic, aluminum, steel, and other materials.

The redemption center typically identifies a distributor for each type of container, and delivers the destroyed containers to the distributor for reimbursement. Typically, a redemption center receives a delivery of empty containers, sorts the containers (e.g., according to material), and identifies and counts the containers to provide this information to the distributor. The return center may crush or shred each container to reduce its volume, and package the containers in bulk for transportation to the distributor.

Often, the process of sorting and counting containers is performed manually, such that containers may be counted incorrectly or credit may be assigned in error for certain containers. For example, a redemption center processing a large delivery may fail to notice that the delivery contains containers for which no deposit was paid (e.g., containers which were purchased by a consumer in a state in which no deposit is imposed). Thus, a redemption center may incorrectly pay a consumer for delivered containers. In addition, the manual process of accounting for each container introduces the possibility that a redemption center may overstate the number of containers to a distributor, such that the distributor may overpay the redemption center.

Recently, some return centers have begun using "reverse vending machines" (RVMs) to receive containers from consumers. These machines may be configured to automatically receive specific types of recyclable containers, and count, identify and densify each container. Reverse vending machines may provide accounting information so that a consumer and return center may be reimbursed appropriately for containers delivered. However, many return centers are not equipped with reverse vending machines, as the cost may be prohibitive for smaller outlets, and the RVM process is inconvenient for consumers.

SUMMARY OF INVENTION

In one embodiment, a method is provided for use in a system comprising a computer and an assembly in communication with the computer, the assembly being configured for identification of a recyclable container and densification of the recyclable container using a densification process which is chosen based on the identification, the computer comprising an electronic file storage. The method is for managing information related to the densification of the recyclable container, and comprises an act of: (A) causing information related to a recyclable container to be stored in the electronic file storage upon the identification of the recyclable container.

Another embodiment provides at least one computer-readable medium which is encoded with instructions, which instructions, when executed in a system comprising a computer and an assembly in communication with the computer, the assembly being configured for identification of a recyclable container and densification of the recyclable container using a densification process which is chosen based on the identification, the computer comprising an electronic file storage, perform a method for managing information related to the densification of the recyclable container. The method comprises an act of: (A) causing information related to a recyclable container to be stored in the electronic file storage upon the identification of the recyclable container.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 4A-4B depict an assembly for conveying a recyclable container to a densification device, according to one embodiment of the invention;

FIGS. 6A-6B depict an assembly used for crushing certain recyclable containers, according to one embodiment of the invention;

DETAILED DESCRIPTION

Figure 1:
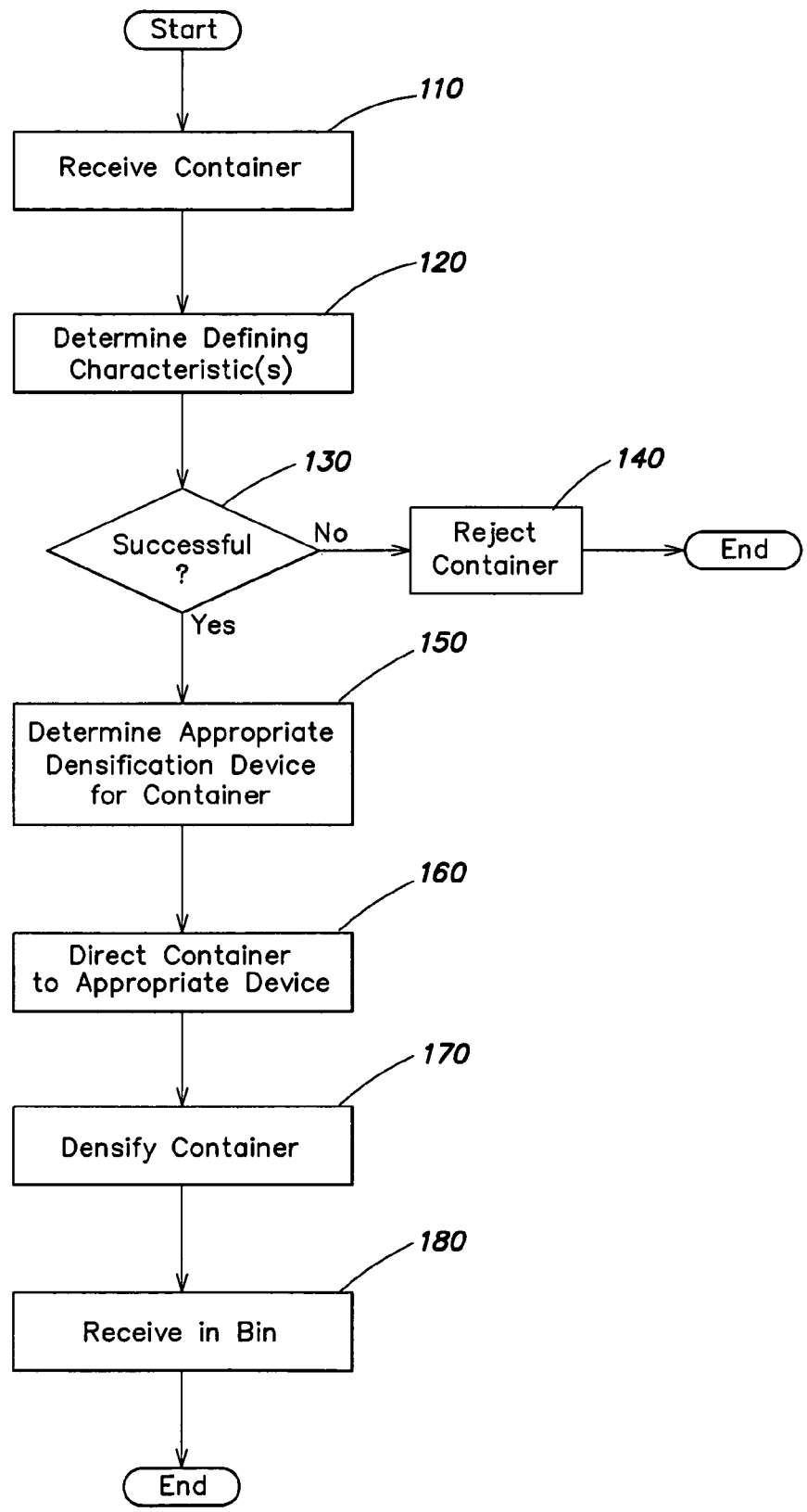
FIG. 1 is a flowchart showing a process for processing recyclable containers, according to one embodiment of the invention.

Applicants have appreciated that a system which may receive, identify and sort a wide range of recyclable containers in a short period of time, and which may allow a redemption center to provide accurate accounting information on the number and type of containers processed, is desirable. Accordingly, one aspect of the invention includes a system capable of receiving, identifying and sorting recyclable containers having any of numerous defining characteristics. For example, the system may receive, identify and sort containers based on their size, material, deliverability to a particular distributor, and/or any other desired characteristic(s).

In one embodiment, the system is configured to receive any number of heterogeneous containers, load the containers individually on to a conveyor path, identify each container according to one or more defining characteristics, and convey each container to an appropriate densification device based on the defining characteristic(s). A container may be conveyed, for example, to a device which performs shredding, crushing, and/or processing in any other suitable manner. After densification, containers may be delivered to a bin or hopper for storage before containers are delivered in bulk to a distributor.

The defining characteristic(s) of a container may be identified in any suitable manner, as the invention is not limited in this respect. In one embodiment, a scanner may be employed to read identifying indicia on the surface of a container. For example, a bar code scanner may be employed to locate and read a bar code printed on a surface of the container. The bar code may provide any information which is useful for identifying the container. For example, the bar code may indicate the manufacturer of the container and/or the material from which the container is made. Based on information provided by the bar code, a container may be directed to an appropriate densification device. For example, a bar code on a container may indicate that the container is a twelve-ounce aluminum can, such that the system may cause the container to be conveyed to a device which is suitable for shredding aluminum cans.

Containers may be directed to a particular densification device based on any suitable characteristic(s). For example, the system may be configured to direct containers made from a particular material (e.g., plastic) to a first densification device, a second material (e.g., aluminum) to a second device, a third (e.g., glass) to a third device, and so on. Alternatively, the system may be configured to segregate containers according to manufacturer, so that all (or a portion) of the containers associated with a specific manufacturer may be directed to a specific densification device for destruction and commingling. Any suitable segregation technique may be implemented, as the invention is not limited in this respect.

The system may be configured to determine the characteristic(s) of a container in any of numerous ways. In one embodiment, the system may be equipped with a device which causes a container to rotate while it is in the purview of the scanner, so that the surface of the container may be presented to the scanner. Rotation of the container may be accomplished, for example, by means of a belt which forms a section of the conveyor path, such as a section which is in the vicinity of the scanner. In one embodiment, the belt may rotate rapidly in a direction which is the opposite of that in which the container otherwise travels along the conveyor path. For example, the belt may force the container in a direction which is opposite of the direction in which a pushing member propels the container along the conveyor path, such that the container is forced against the pushing member and forced to spin rapidly. This feature is described in greater detail below.

In one embodiment, the system may be equipped with a device which determines whether a container exceeds a predetermined size (e.g., circumference), so that a container which exceeds the predetermined size may be caused to rotate more rapidly than a smaller container while in the vicinity of a scanner. In this manner, the surface of the larger container may be more effectively presented to, for example, a bar code scanning device. If the device determines that a container exceeds a certain size, the device may communicate with a programmable logic controller (PLC) which may employ a processor to communicate instructions to a motor to speed up the rotation of the belt to facilitate the presentation of a greater amount of container surface area to the scanner.

The system may be equipped with any suitable number and type of densification devices. In one embodiment, individual devices may be provided for shredding aluminum cans, shredding plastic bottles, and/or shattering glass containers. Further, a plurality of a particular type of device may be provided, so that different size containers may be processed more effectively. For example, the system may include two separate shredding devices, including a first shredding device for smaller containers (e.g., twelve-ounce aluminum cans) and a second device for larger containers (e.g., two liter plastic bottles). The system may include any suitable number of densification devices, as the invention is not limited in this respect.

According to one embodiment, the system performs a process which is described below with reference to the flowchart of FIG. 1 and the top view of an exemplary embodiment of the system shown in FIG. 2.

Referring first to FIG. 1, upon the start of the process, in act 110 a container is received by the system. A container may be manually or automatically fed to the system. In one embodiment, a container may be presented manually (e.g., by an operator) to the system via intake platform 210 (FIG. 2). However, the invention is not limited in this respect, as any suitable intake mechanism may be employed. For example, a device may be employed to automatically select a container from a collection of containers, and feed it to the system for processing.

Figure 2:
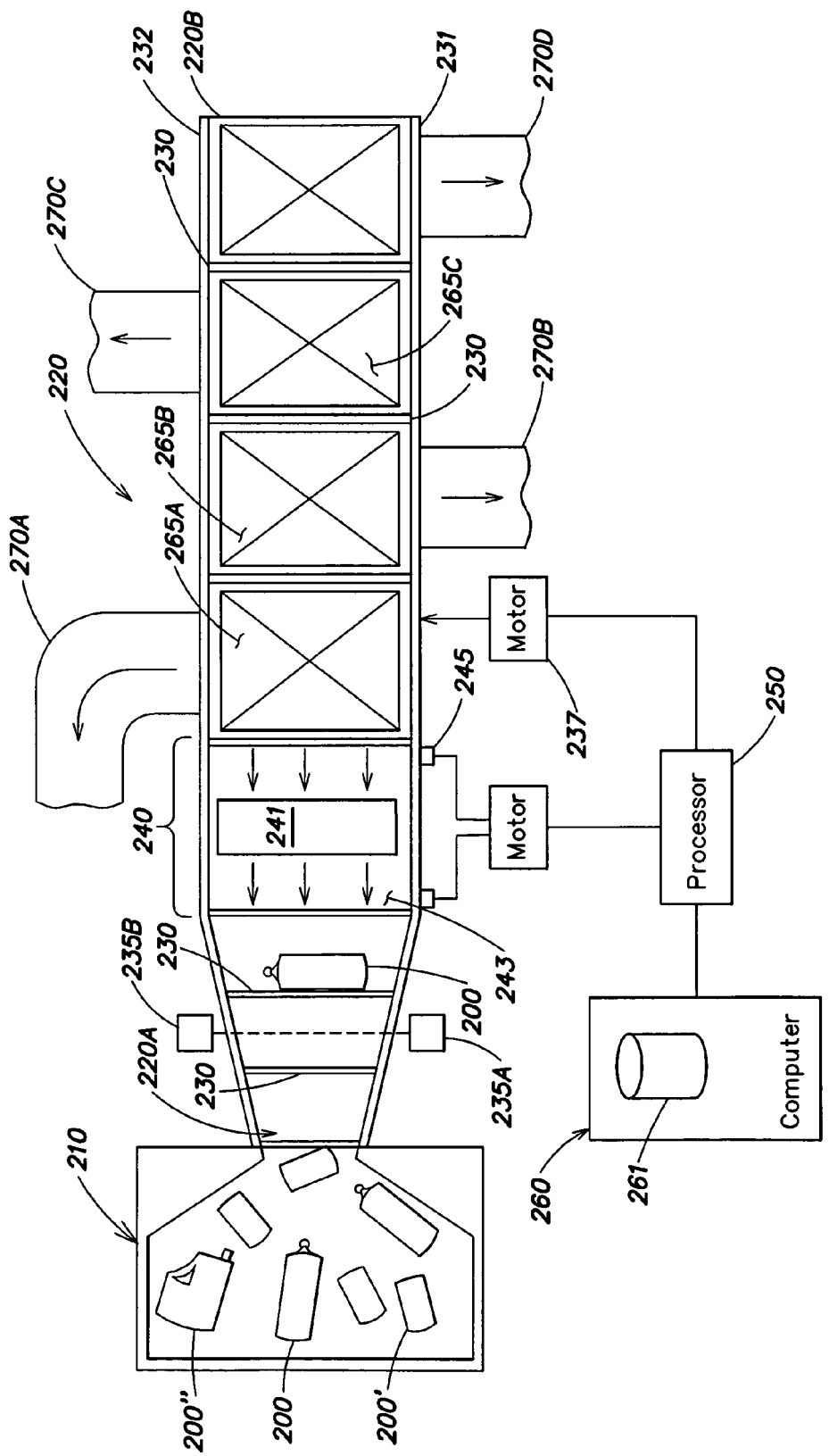
FIG. 2 is a top view diagram of an apparatus for processing recyclable containers, according to one embodiment of the invention.

In the embodiment shown in FIG. 2, intake platform 210 is located at first end 220A of a stationary, longitudinally extending conveyor path 220. A container may be supported on path 220 while it is processed (e.g., presented to a scanner for identification, and conveyed to a densification device). In the embodiment shown, a container is discharged from path 220 at a position intermediate the first end 220A and second end 220B. Upon being caused to exit path 220, a container may be delivered for processing to a particular densification device, as described below.

In FIG. 2, three exemplary types of containers are shown, including bottle 200, can 200', and jug 200". However, the system is not limited to processing these types of containers, as any suitable container may be processed.

For purposes of illustrating the embodiment of the system shown in FIG. 2, the description below assumes that bottle 200 is formed of glass, can 200' is formed of aluminum and jug 200" is formed of a plastic material (e.g., high density polyethylene (HDPE) or polyethylene teraphthalate (PET)). It should be appreciated, however, that a container manufactured from any suitable material may be processed by the system, in any of numerous ways. For example, a given container, may be crushed, shredded, and/or processed in any other suitable manner.

Any of containers 200, 200' and 200" may be delivered from input platform 210 to first end 220A of path 220. For example, a container may be fed manually to path 220 (e.g., by an operator who places containers on path 220). In one embodiment, each container is fed to the system individually, although the invention is not limited in this respect. In the system of FIG. 2, an individual container may be fed to path 220 and may be caught and propelled by one of pushers 230. In one embodiment, pushers 230 may be a plurality of parallel spaced members positioned transverse 220 along its length. Each of pushers 230 may, for example, form a slat-like structure which is disposed generally upright with respect to path 220 as it travels along the length of the path, so as to propel a container along the path. In one embodiment, each pushers 230 is separated by an equal distance along the length of path 220.

Pushers 230 may be moved along path 220 (in a left-to-right direction as shown in FIG. 2) by drive means 231, 232, disposed on either side of path 220. Each of drive means 231, 232 may be, for example, endless belts, such as toothed belts or chains. Drive means 231, 232 may be mechanically interconnected so as to operate in a common fashion, or independent. In one embodiment, drive means 231, 232 may be operated by a motor 237.

In the embodiment shown, the portion of path 220 which is disposed near first end 220A forms an angle with the horizontal, such that as a container is loaded on to path 220, it is forced by gravity against pusher 230 as it proceeds along path 220, and is propelled up the incline defined by path 220 toward scanning station 240.

In one embodiment, a container may be propelled along path 220 past size detector 235. Size detector 235 may, for example, include light emitting device 235A and light receiving device 235B, each of which may be disposed at a predetermined height above path 220 in order to detect containers which exceed that height. In one embodiment, light projection device 235A may project, and light receiving device 235B may receive, a path of light. The path of light may be projected continuously or intermittently.

In one embodiment, if light receiving device 235B fails to receive a path of light projected by light emitting device 235A, size detector 235 may determine that a container traveling along path 220 is of sufficient size to block the path of light. If so, size detector 235 may communicate with processor 250 (e.g., via one or more cables or other suitable communication equipment), and processor 250 may in turn communicate with one or more components in scanning station 240. Processor 250 may be integrated with a programmable logic controller, although the invention is not limited in this respect. The use of information produced by size detector 235 is discussed further below with reference to act 120.

It should be appreciated that although the size detector 235 shown in FIG. 2 relies on the projection and receipt of a path of light to determine whether a container on path 220 exceeds a predetermined size, the invention is not limited in this respect. Any suitable mechanism may be employed for determining whether a container exceeds a predetermined size. For example, any suitable mechanical or electromechanical device may alternatively be employed.

Referring again to FIG. 1, upon the completion of act 110, the process proceeds to act 120, wherein one or more defining characteristics of the container are determined. In the embodiment shown in FIG. 2, scanning station 240 is employed to determine the defining characteristic(s) of a container. However, any suitable technique for determining the defining characteristic(s) of a container may be employed.

In the system of FIG. 2, scanning station 240 includes scanning device 241. In one embodiment, scanning device 241 includes a component which is configured for visually detecting bar code or other identifying indicia on the surface of the container, such as indicia which may be printed on a label adhered to the container. Scanning device 241 may be capable of detecting indicia which is located on the top, side or bottom of a container. Further, FIG. 2 depicts scanning device 241 as being positioned above path 220, scanning device 241 may be disposed in any suitable location, such as along one or more sides of path 220.

It should be appreciated that any suitable device may be employed for determining the identifying characteristic(s) of a container, and that any number and type of characteristics may be determined. For example, scanning device 241 may include a component which is capable of determining the structure and properties of a material or compound from which a container is made. For example, scanning device 241 may include one or more components configured for determining the characteristic(s) of a container via mass spectrometry, resonance imaging, optical recognition, resonance ionization mass spectrometry (RIMS), and/or other techniques. The invention is not limited to any particular device or technique for identifying the characteristic(s) of a container, or the speed at which identification is performed.

In the embodiment shown in FIG. 2, scanning device 241 includes a bar code scanning device which is designed to locate and read bar code indicia which is printed on the surface of the container. So that the surface of a container is effectively presented to scanning device 241 for inspection, in the embodiment shown, scanning station 240 includes a rotating belt 243. Belt 243 may be driven by motor 247 and/or any other suitable means. In the embodiment shown, motor 247 causes belt 243 to rotate in a direction which is opposite to the direction in which container 200 is propelled by pusher 230 along path 220 (i.e., belt 243 rotates right-to-left, as designated by the arrows shown in FIG. 2). Belt 243 may be formed of a material which creates sufficient friction so that both round containers and non-round containers (e.g., squared gallon jugs) are forced to rotate while in scanning station 240. As such, the system may be capable of processing containers having any of numerous shapes. However, the system is not limited to such an implementation, as belt 243 may alternatively be formed of a material which creates insufficient friction for causing non-round containers to rotate. In this embodiment, non-round containers may be fed to path 220 such that identifying indicia (e.g., a bar code) are on the surface which faces scanning device 241.

Scanning device 241 may be capable of inspecting a container's surface for only a limited "scan area," defined by the length along path 220 bounded by reference numeral 240. For example, many bar code scanners require that a bar code be presented to the scanner within a limited area in order for the bar code to be effectively read. Consequently, in one embodiment, belt 243 is caused to rotate at a speed sufficient to cause the entire surface of most containers (defined by the circumference of the largest of those containers) to be presented to device 241 for scanning. A constant rotation of belt 243 at a higher speed may not be desirable, because faster rotation may make the system more costly to operate. However, at a slower rotation speed, larger containers may not be rotated fast enough for their entire surface to be presented to the scanner.

To balance these concerns, when size detector 235 detects that a larger container is approaching the scanner, size detector 235 communicates with processor 250, which may in turn instruct motor 247 to accelerate when container 200 arrives at scanning station 240, and decelerate to its normal rotation speed after a predetermined period (e.g., the period required for the container to pass the scan area). As such, the surface of larger containers may be more effectively presented to the scanning device, without incurring appreciably higher operating costs.

Figure 3:
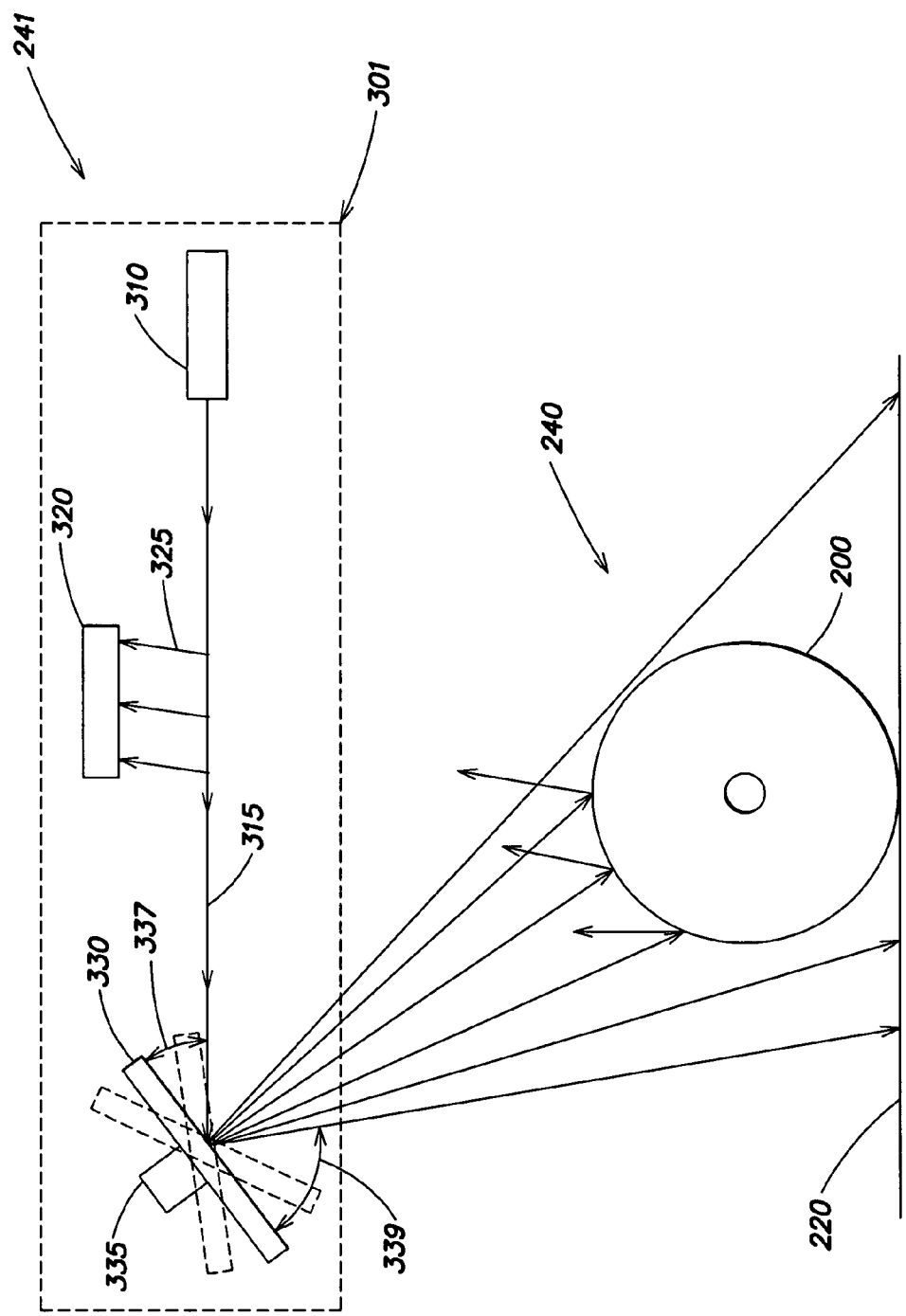
FIG. 3 is a block diagram showing an assembly for determining characteristics of a recyclable container, according to one embodiment of the invention.

An exemplary embodiment of scanning device 241 is shown in FIG. 3. In the embodiment shown, scanning device 241 includes casing 301, which holds light emitting element 310 and light receiving element 320. Casing 301 is exposed to path 220 so that light projected by light emitting element 310 may irradiate scanning station 240 on path 220. In particular, light 315 projected by light emitting element 310 is reflected from mirror 330 (mounted on shaft 335) toward container 200 in scanning station 240, and then light 325 is reflected from container 200 toward light receiving element 320.

In one embodiment, mirror 330 is mounted on shaft 335 in a manner such that the rotation of shaft 335 will cause angle 337 to change over time. That is, the rotation of shaft 335 may cause mirror 330 to oscillate slightly, as indicated by the dotted lines in FIG. 3. As a result of the oscillation, the angle 339 at which light 315 is reflected from mirror 330 toward path 220 changes over time, such that a greater scan area is produced in scanning station 240 than if mirror 330 were mounted in a stationary position. As such, the probability that indicia on container 200 is presented within the scan area may be increased. For example, reflection of light 315 over a wider area in scanning station 240 increases the probability that the portion of the surface of container 200 on which indicia is printed will be presented to light receiving element 320 while container 200 is rotated in the scan area.

Any of numerous techniques may be employed to produce an oscillation of mirror 330. For example, an oscillation may be produced by a magnet, mounted to mirror 330, to which alternating currents are applied on a predetermined cycle.

In the embodiment shown in FIG. 2, information provided by scanning device 241 may be used to determine the defining characteristic(s) of the container. For example, information read from the surface of the container may be communicated from scanning device 241 to computer 260 to identify the defining characteristic(s) of the container. For example, information read from the surface of the container may be compared to information stored in electronic file storage 261. For example, electronic file storage 261 may maintain an association between certain bar code information (or a derivative thereof) and the size, manufacturer, material and/or other characteristics of particular containers, such that a comparison between information read from the surface of the container and information stored in electronic file storage 261 may allow one or more characteristics of the container to be ascertained. Based on the ascertained characteristic(s), computer 260 may communicate instructions to processor 250 for conveying the container along path 220, as described in greater detail below with reference to acts 140 and 150.

The information which may be stored in electronic file storage 261 is described in greater detail below, with reference to FIG. 9.

Referring again to FIG. 1, upon the completion of act 120, the process proceeds to act 130, wherein a determination is made as to whether the characteristic(s) of the container have been determined successfully. For example, it may be determined in act 130 whether scanning device 241 was able to successfully locate a bar code on the surface of container 200, and/or if the bar code information read by scanning device 241 was compared (e.g., matched) successfully to data stored in electronic file storage 261. If it is determined that the defining characteristic(s) of the container were not determined successfully, the process proceeds to act 140, wherein the container is rejected. In one embodiment, the container 200 may be caused to exit path 220 and may be directed to a reject bin. An exemplary technique for causing a container to exit path 220 is described with reference to act 170 below. Upon the completion of act 140, the process completes.

If it is determined in act 130 that the defining characteristic(s) of the container have been determined successfully, the process proceeds to act 150, wherein an appropriate densification device for the container is determined. In one embodiment, computer 260 may store an association between specific defining characteristic(s) and specific densification devices in electronic file storage. For example, computer 260 may store an association between containers made from a specific material and a particular densification device. For example, containers made from a first material may be directed to a first densification device, containers made from a second material may be directed to a second device, and so on. Alternatively, computer 260 may store an association between containers having a particular size and a particular densification device. For example, containers having a first (e.g., smaller) size may be directed to a first densification device, while containers having a second (e.g., larger) size may be directed to a second device, and so on. Based on the association, computer 260 may communicate instructions to processor 250 to cause the container to be directed to a specific device.

Upon the completion of act 150, the process proceeds to act 160, wherein the container is directed to a specific densification device. This may be accomplished in any of numerous ways. In one embodiment, processor 250 may receive instructions from computer 260, and may communicate with one or more components located along path 220 at specific junctures to cause a container to be directed to an appropriate densification device. For example, processor 250 may cause container 200 to be propelled along path 220 by a pusher 230 until the container reaches a specific gate (i.e., one of gates 265A-265D), at which time processor 250 may communicate with the appropriate gate to cause container 200 to exit path 220, such that the container may be delivered to a particular densification device.

In one embodiment, computer 260 stores additional information which may be used to determine the device to which a container is directed. For example, computer 260 may store an indication of the status of particular densification devices on the system, and this indication may influence the device to which a container is directed. For example, computer 260 may store an indication that the device corresponding to gate 265B is malfunctioning. As a result, computer 260 may communicate instructions to processor 250 to cause a container which would otherwise be directed to the malfunctioning device to be directed to another device (e.g., the device corresponding to gate 265C). Any suitable information may be stored and employed in any suitable fashion to determine the device to which a container is to be directed.

In the embodiment shown in FIG. 2, one or more of gates 265A-265D may form a "trap door" in the floor formed by path 220, such that upon actuation of a gate a container may be forced by gravity to exit path 220 and fall into a conduit (e.g., a chute) through which the container is delivered to a particular densification device.

In one embodiment, the actuation of a gate 265 may be influenced by whether scanning device 241 and/or size detection device 235 had previously determined that the container exceeds a predetermined size. For example, if the container exceeds the predetermined size, the gate may be held in an open position for a longer period than normal to allow the container to escape path 220 completely before gate 265 is closed. Other techniques may also, or alternatively, be employed to ensure that a container escapes path 220 before a gate is closed. For example, in one embodiment, the system may be equipped with a device for forcing a jet of air toward the container from above path 220 as gate 265 opens, so that the container is forced downward through the opening more quickly. Any of numerous techniques may be employed.

FIGS. 4A-4B show an exemplary embodiment of a trap door exit in further detail. FIG. 4A shows the exemplary trap door exit in a closed position, and FIG. 4B shows the exemplary trap door exit in an open position. Exit 400 includes door 401, which forms a portion of conveyor path 220 when in a closed position. Door 401 is operable by rotary actuator 405. In order to communicate instructions to rotary actuator 405, processor 250 may be connected via wires or other suitable communications medium (not shown).

Door 401 is attached via link 420 and clevis 415 to a shaft 410 provided on actuator 405. While clevis 415 is fixedly attached to shaft 410, such that a rotation of shaft 410 will cause a corresponding change in position of clevis 415, link 420 is attached to clevis 415 so as to allow link 420 to rotate with respect to a pivot point defined by hinge 417.

As shown in FIG. 4B, when processor 250 communicates instructions to actuator 405 to cause container 200 to exit path 220, actuator 405 causes shaft 410 to rotate in a clockwise direction. Clevis 415 also rotates accordingly, thereby exerting a force on link 420 via hinge 417 and causing door 401 to be pulled downward. More particularly, door 401 rotates about hinge 402. As door 401 moves downward, container 200 is caused by gravity to drop into an exit path (e.g., one of paths 270A-270D shown in FIG. 2) toward an appropriate densification device.

It should be appreciated that the invention is not limited to employing a trap door to deliver a container to a densification device. Any suitable mechanism or technique for causing a container to exit path 220 and be delivered to a densification device may be employed.

In one embodiment, gates 265A-265D are disposed along path 220 at known positions, and drive means 231, 232 propel pushers 230 along path 220 at a known speed. Because the speed of the drive means and the position of the gates is known, the system may track the progress of a pusher 230 (and thus a container propelled by the pusher) along path 220. For example, processor 250 may track the position according to a time period which elapses after the pusher/container exits scanning station 240. In one embodiment, path 220 may be slightly inclined so that end 220B resides at a slightly higher elevation than end 220. As a result, gravity may force a container to rest against a pusher as it is propelled along the path, and its position may be more precisely known.

In one embodiment, one or more sensors (not shown in FIG. 2) may also, or alternatively, be implemented proximate gates 265A-265D to determine when a particular pusher arrives at a gate. For example, a sensor implemented several inches before gate 265B along path 220 may detect that a particular pusher has arrived at gate 265B.

As such, the arrival of a particular pusher at a particular gate may be determined based on the physical presence of a pusher as detected by one or more sensors, a time period which elapses after a pusher exits the scanning station, both of these indications, or via any other suitable technique.

If gate 265B corresponds to the particular densification device to which the container is to be directed, processor 250 may cause gate 265A to be actuated to cause the container to exit path 220 and be delivered to the device. In one embodiment, one or more additional sensors may be implemented proximate gates 265A-265D to determine when a pusher has moved past a particular gate. For example, a sensor may be implemented several inches after gate 265B along path 220 to detect that a particular pusher has moved past gate 265B.

Using this technique, processor 250 may actuate any of gates 265A-265D to cause a container to exit path 220 and be delivered to a particular densification device. For example, if it is determined in act 150 (while a container is located within scanning station 240) that the container should be directed to the densification device associated with gate 265C (i.e., along path 270C), then in act 160, at the appropriate time and/or when the presence of the pusher propelling the container is detected proximate gate 265C, processor 250 may cause gate 265C to be actuated to deliver the container along path 270C to the selected device.

In one embodiment, gates 265A-265D are separated along path 220 by a distance which is less than the distance that separates pushers 230, to balance concerns relating to system effectiveness and size. For example, system effectiveness with regard to determining container characteristics may be improved by maximizing the length of scanning area 240, so as to keep a container within the scanning area for a greater amount of time and thereby increase the probability that the defining characteristic(s) of the container are determined. The distance between pushers 230 may approximate the length of scanning area 240 because the system may be capable of processing only one container within scanning area 240 at a time. Thus, it may be advantageous to maximize the distance separating the pushers. However, it may not be advantageous to separate gates 265 by such a large distance because this may cause path 220 to be lengthened, thereby unnecessarily increasing the size of the system.

It should be appreciated that the system is not limited to tracking the location of a container using the above-described devices and techniques, as any suitable device(s) and/or technique(s) may be employed. For example, an indexing scheme or encoding device may be implemented.

In one embodiment, if a container is rejected in act 140, then gate 265A may be actuated when the container is propelled thereto, and the container may be directed down path 270A (e.g., to be returned to an operator).

It should be appreciated that although the system depicted in FIG. 2 includes three separate paths associated with three different densification devices, any suitable number of paths and/or devices may be provided, as the invention is not limited in this respect. For example, two paths may lead to a single device, or vice versa. In addition, all paths on the system may not lead to a densification device. For example, one or more paths may be configured to receive a container that could not be directed to a densification device for some reason, such as because the gate 265 corresponding to the device malfunctions.

Upon the completion of act 160, the process proceeds to act 170, wherein the container is processed by a densification device. In one embodiment, upon actuating the gate 265 associated with the device, processor 250 communicates with the device to start a motor forming a component of the device. Consequently, the device may be started as the container travels down one of paths 270 toward the device, such that the container may be processed immediately upon its arrival at the device. The motor may alternatively be started at another suitable time, such as a time defined with reference to the opening of a gate 265. As a result, the cost of operating the system may be reduced, by eliminating the cost associated with running the motor continuously while the machine is in operation.

Figure 5:
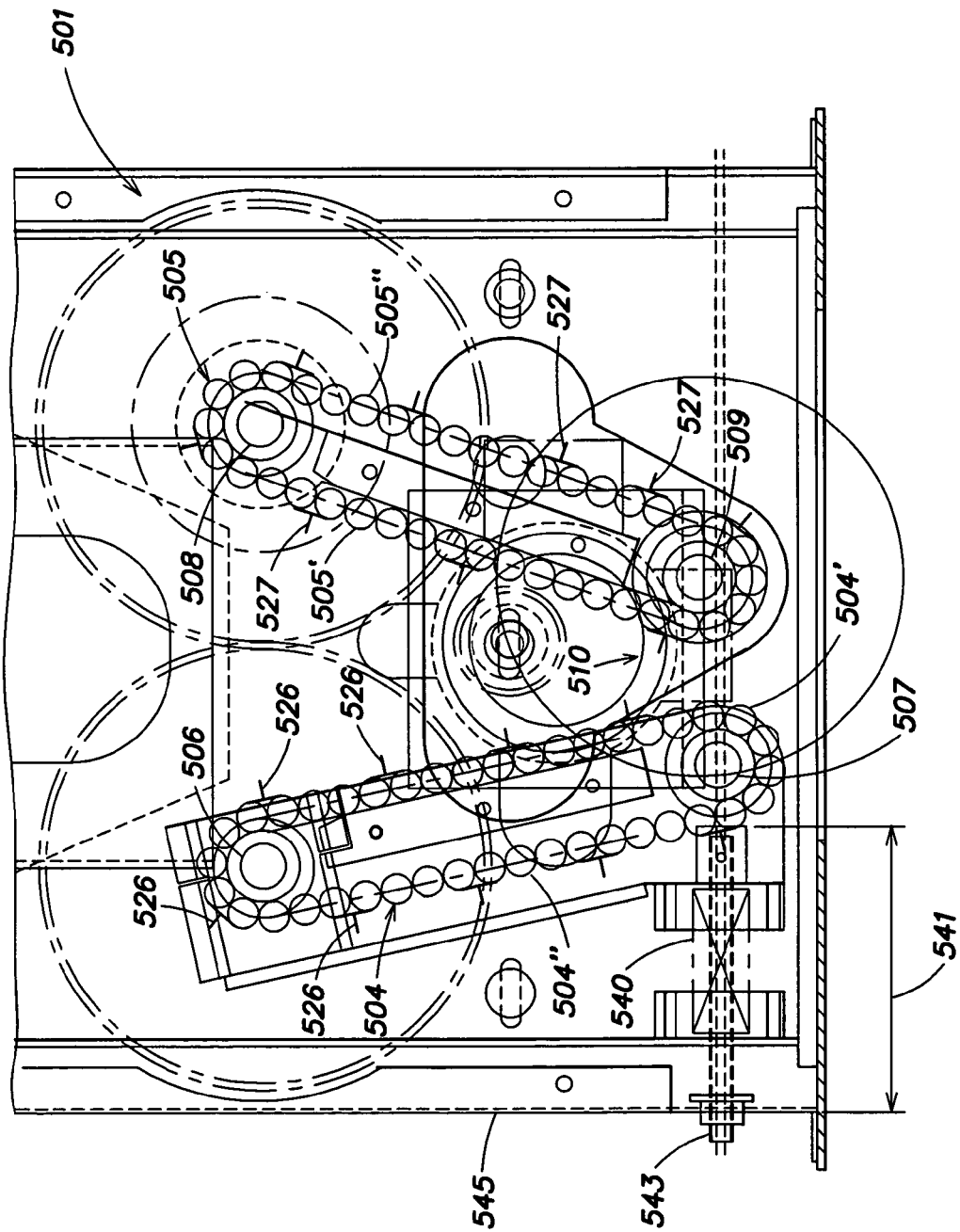
FIG. 5 depicts an assembly used for shredding certain recyclable containers, according to one embodiment of the invention.

As discussed above, any number and type of densification device(s) may be employed on the system. FIGS. 5 and 6A-6B depict two exemplary devices which may be implemented. Specifically, FIG. 5 depicts an exemplary device which may be employed to shred plastic or aluminum cans or bottles, and FIGS. 6A-6B depicts an exemplary device which may be employed to crush glass containers.

FIG. 5 depicts a device that may, for example, be particularly useful in crushing a plastic container having a stiff neck portion. In particular, the neck portion of some plastic bottles can be so stiff that the motor included in some conventional devices may not be powerful enough to crush the bottles and force them through a narrow opening defined by the device into a storage bin. As a result, these bottles may become stuck in the opening, causing the devices to stall or experience other malfunctions. Other containers may also cause these and other device malfunctions.

Exemplary device 501 includes a pair of mutually inclined endless belts (e.g., chains) 504, 505. The belts have bottle-engaging front sides 504' and 505', and rear sides 504" and 505", respectively. The belt 504 may be suspended by means of rollers 506, 507, which may be driven by a motor (not shown) and which may force belt 504 to rotate in a clockwise direction as viewed in FIG. 5. Similarly, belt 505 may be suspended by means of rollers 508, 509, which may also be driven by a motor (not shown) and may force the belt 505 to rotate in a counter-clockwise direction as viewed in FIG. 5. A bottle arriving to be processed by device 501 is thus forced toward opening 510 by the rotation of belts 504, 505.

Belts 504, 505 may each be provided with a plurality of chain attachments (e.g., studs) 526, 527, respectively. Chain attachments 526, 527 may be formed of any suitable material (e.g., steel or other metal), and may be embedded or inserted in the belts 504, 505 so as to engage and puncture a container as it is forced toward opening 510 by the rotation of belts 504, 505.

In one embodiment of the invention, when a container enters opening 510 and is gradually subjected to increasing pressure, as roller 507 is forced slightly to the left (about a pivot point defined by roller 506) to provide sufficient space for the container to exit the device at the lowermost end of opening 510, the motion of roller 507 is opposed by resilient mechanism 540. Resilient mechanism 540 may include a spring, or any other mechanism suitable for opposing the motion of roller 507.

Any suitable amount of opposing force may be applied by resilient mechanism 540. For example, resilient mechanism may apply an amount of force which is predetermined based on a known stiffness of a particular container, or based on any other suitable parameter.

As a result of the placement of resilient mechanism 540, roller 507 may be allowed to move about a pivot point defined by roller 506, such that opening 510 is allowed to widen to accommodate more rigid containers when necessary. As a result, a device malfunction, such as stalling of the motor driving rollers 506-509, may be prevented, while an amount of force sufficient to puncture and crush more pliable containers may be applied.

In one embodiment, the position of, and force applied by, resilient mechanism 540 may be adjusted. For example, a screw 543 may be provided for adjusting the distance 541 from side wall 545 that resilient mechanism 540 extends, thereby adjusting the angular position of belt 504 relative to the pivot point defined by roller 506.

The use of a resilient mechanism 540 may allow a less powerful motor to be employed, thereby reducing the cost associated with operating the system. For example, without a resilient mechanism implemented, a less powerful motor may be prone to stalling or other malfunctions when stiffer articles are introduced into opening 510. With a resilient mechanism, however, a device having a less powerful motor may successfully process stiffer articles, without incurring the higher energy costs associated with more powerful motors.

FIGS. 6A-6B depict a device 600 which may be employed for the densification of glass containers according to one embodiment of the invention. Specifically, FIG. 6A provides a front view of the device, while FIG. 6B provides a side view. Device 600 includes a casing 610 which is open at the top and bottom and defined by side walls 612. A shaft 644 is mounted for rotation, and is driven by motor 610.

In the exemplary device shown, shaft 644 includes a single cavity 646 which is suitable for installation of a steel member 645. In other embodiments, a plurality of cavities 646 may be formed in shaft 644. Further, cavities may be provided in any suitable configuration. For example, an exemplary implementation may include two cavities formed in shaft 644 at right angles to each other.

In one embodiment, member 645 has a generally cylindrical shape. When installed in cavity 646 of shaft 644, member 645 extends from the shaft such that, as the shaft 644 rotates, the member rotates about the shaft. Member 645 is configured such that when it rotates about shaft 644, it does not contact side walls 612. In the embodiment shown in FIG. 6A, shaft 644 and member 645 rotate in a clockwise direction at high speed (in one embodiment, at approximately 1,200 revolutions per minute).

In operation, a glass container 200 descends into casing 610 via exit path 270, entering casing 610 through an opening at the top. Shaft 644 is disposed closer to side wall 612B than side wall 612A so that container 200 tends to fall into opening 647. As it does so, it is contacted by rotating member 645. The member 645 is configured to place substantial stress on localized portions of the container, such that the container will tend to break easily. In addition, the member rotates so rapidly, and in a direction that tends to keep container 200 within opening 647, that the member may contact container 200 multiple times. As such, container 200 tends to shatter into many small pieces. If multiple members 645 are implemented, this effect may be compounded.

In one embodiment, member 645 may be affixed within cavity 646 by means of a set screw (not shown) installed in cavity 650. Further, in one embodiment, a member may not be completely cylindrical, but rather may include one or more flat faces designed to accommodate the set screw. In the embodiment shown in FIG. 6A, because the cavity 650 is disposed parallel to the direction of travel of container 200, a flat face on member 645 may contact container 200 as it approaches opening 647.

The provision of one or more flat faces on member 645 may facilitate easier installation, a sturdier assembly, and easier maintenance of the member. For example, when significant wear is observed on one face of the member, the member may simply be turned over so that the opposing face is presented to containers entering the casing.

Referring again to FIG. 1, upon the completion of act 170, the process proceeds to act 180, wherein the container, now processed by the densification device, is received in a bin. In one embodiment, upon the completion of act 170, processor 250 informs computer 260 that the densification of the container is complete. Computer 260 may store this information (e.g., in electronic file storage 261) so that accurate information on the number, weight and/or count of containers processed (or any other suitable information) by the system may be provided to interested parties, such as distributors.

Upon the completion of act 180, the process completes.

In one embodiment, glass containers processed by a densification device may travel through an airtight passage to a storage bin, such that operators of the system may not be exposed to airborne glass particles. An exemplary implementation of an airtight passage is depicted in FIGS. 7A-7B.

Figure 7A:
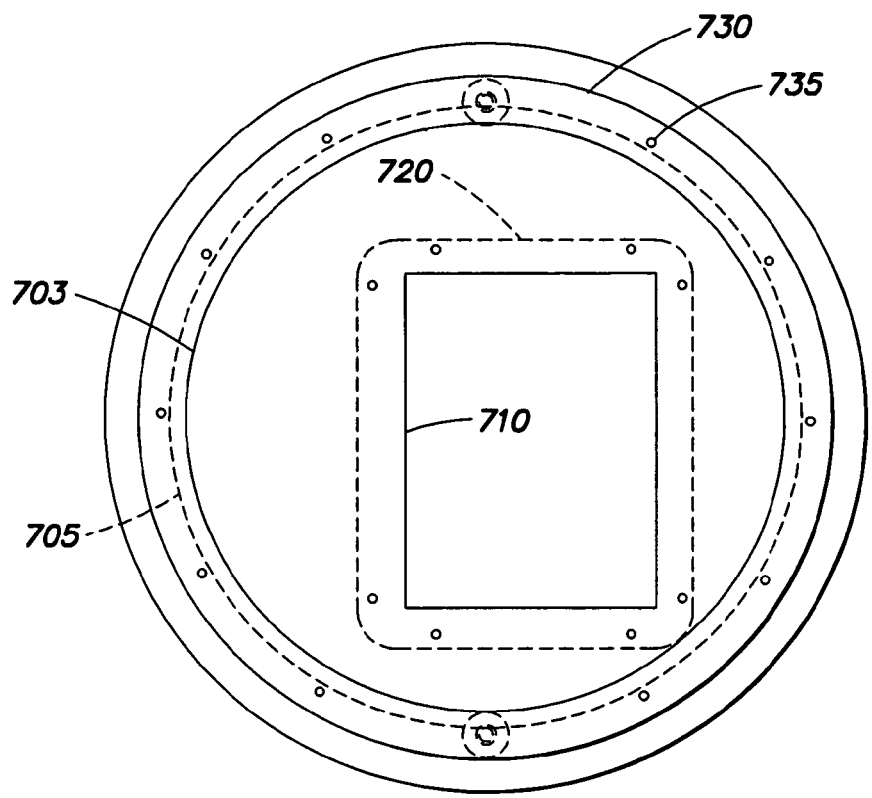
FIGS. 7A-7B depict an assembly used for transporting crushed and/or shredded containers to a storage bin, according to one embodiment of the invention.
Figure 7B:
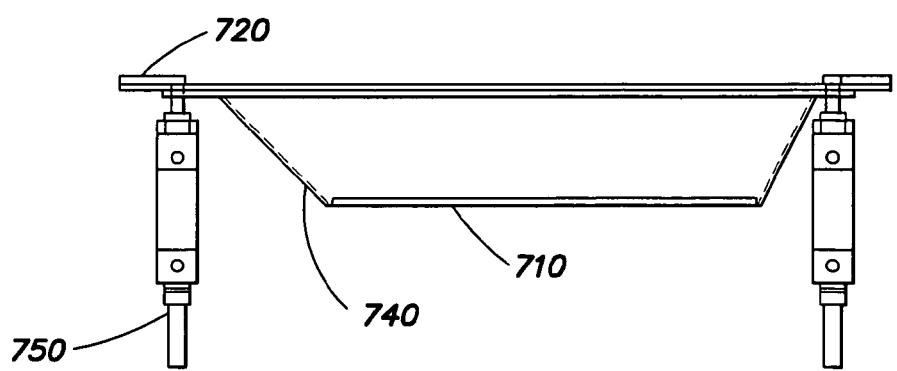

FIG. 7A shows a top view of the airtight passage. Specifically, dust cover 703 is mounted atop a bin (not shown, but having a periphery indicated by the dotted line at 705). In the embodiment shown, dust cover 703 is mounted to the bin via ring 730 and one or more screws 735. In one embodiment, one or more pieces of foam rubber may be provided to. provide an airtight seal between the bin and ring 730. As an example, the foam rubber piece(s) may be cut to fit between ring 730 and the bin along its periphery 705.

Dust cover 703 includes cutout 710, which is provided roughly in the shape of the bottom of a casing of a densification device (e.g., casing 610, FIG. 6A). FIG. 7B shows that cutout 710 may have membrane 740 attached. Membrane 740 may be formed, for example, from a pliable, airtight material such as rubber, and may form a bellows between the bin and the densification device. Specifically, membrane 740 may be mounted fixedly via the attached bracket 720 to the bottom of a densification device casing (e.g., casing 610) via one or more fastening devices 750. As such, as glass particles travel from the casing to the bin, they will be conveyed though the airtight passage defined by membrane 740 and thus not discharged into the air. Because airborne glass particles may be hazardous to human health, the assembly of FIGS. 7A-7B may make the system safer to operate.

In one embodiment, a separate bin may be provided for each densification device implemented on the system. For example, if three densification devices are implemented, then three bins may be provided so that containers processed by each device arrive in a separate bin.

In one embodiment, one or more of the bins implemented in the system may have a plurality of segregated portions into which processed containers may be received. Further, the position of a bin may be adjustable so that densified containers are received in a first portion for a predetermined interval (e.g., for a specific time period, and/or until a fixed number of containers are directed into the first portion of the bin), and then the bin's position may be adjusted so that processed containers arrive in a second portion.

Figure 8A:
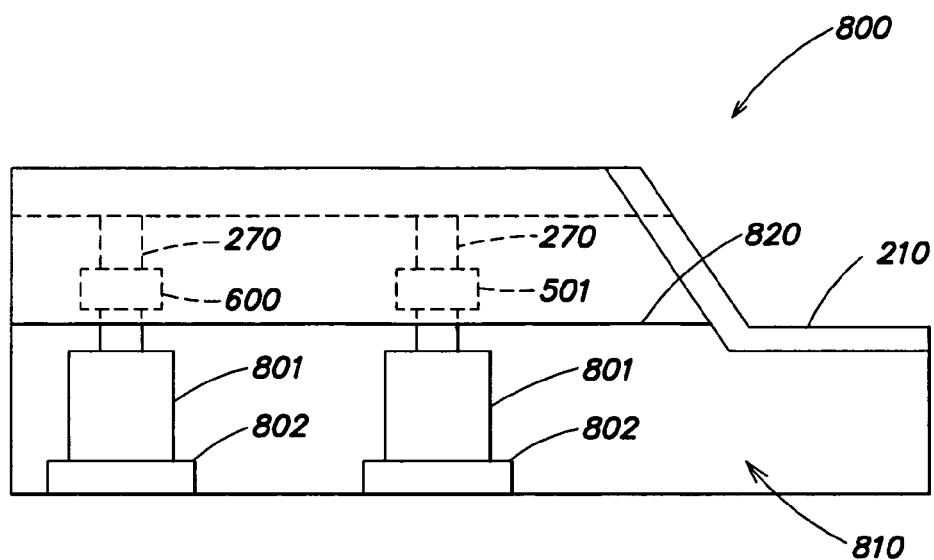
FIGS. 8A-8B depict an assembly for collecting recyclable containers for storage, according to one embodiment of the invention.
Figure 8B:
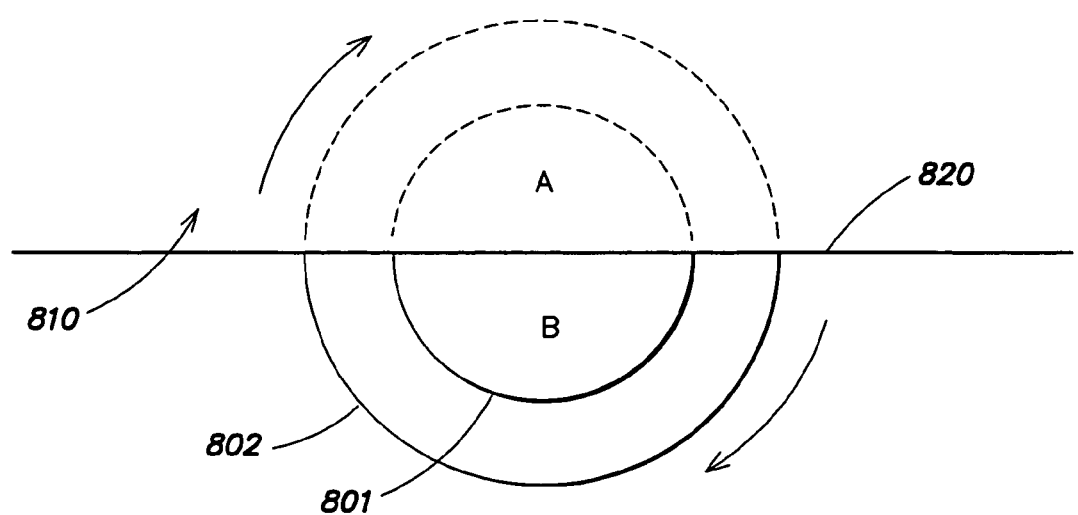

In the exemplary embodiment shown in FIGS. 8A-8B, cylindrical bins 801 are disposed partially within a cavity portion 810 of the system 800, such that a first portion A of bin 801 is obscured by wall 820, and a second portion B of bin 801 is exposed. Bin 801 is installed on rotating pedestal 802. When system 800 is operated, densified containers may be received in portion A of bin 801 for a predetermined interval. When the interval has elapsed, the pedestal 802 may be rotated (e.g., while the system continues to operate) in any suitable direction so that portion A becomes exposed and portion B becomes obscured by wall 820 in cavity portion 810. Consequently, any containers which may have been received in portion A during the operation of system 800 may be removed, and/or any other desired maintenance may be performed. For example, a container (e.g., a plastic bag, not shown) which had been installed to capture densified containers in portion A may be removed, while system 800 continues to receive densified containers in portion B. As a result, system 800 need not be shut down for bins 801 to be emptied.

In one embodiment, information on containers processed by the system may be stored in electronic file storage 261. For example, in one embodiment, data on containers processed may be stored in a database, such as a relational database. A simplified version of a data structure used by a relational database management system (RDBMS) to support one or more of the functions discussed herein is shown in FIG. 9.

Figure 9:
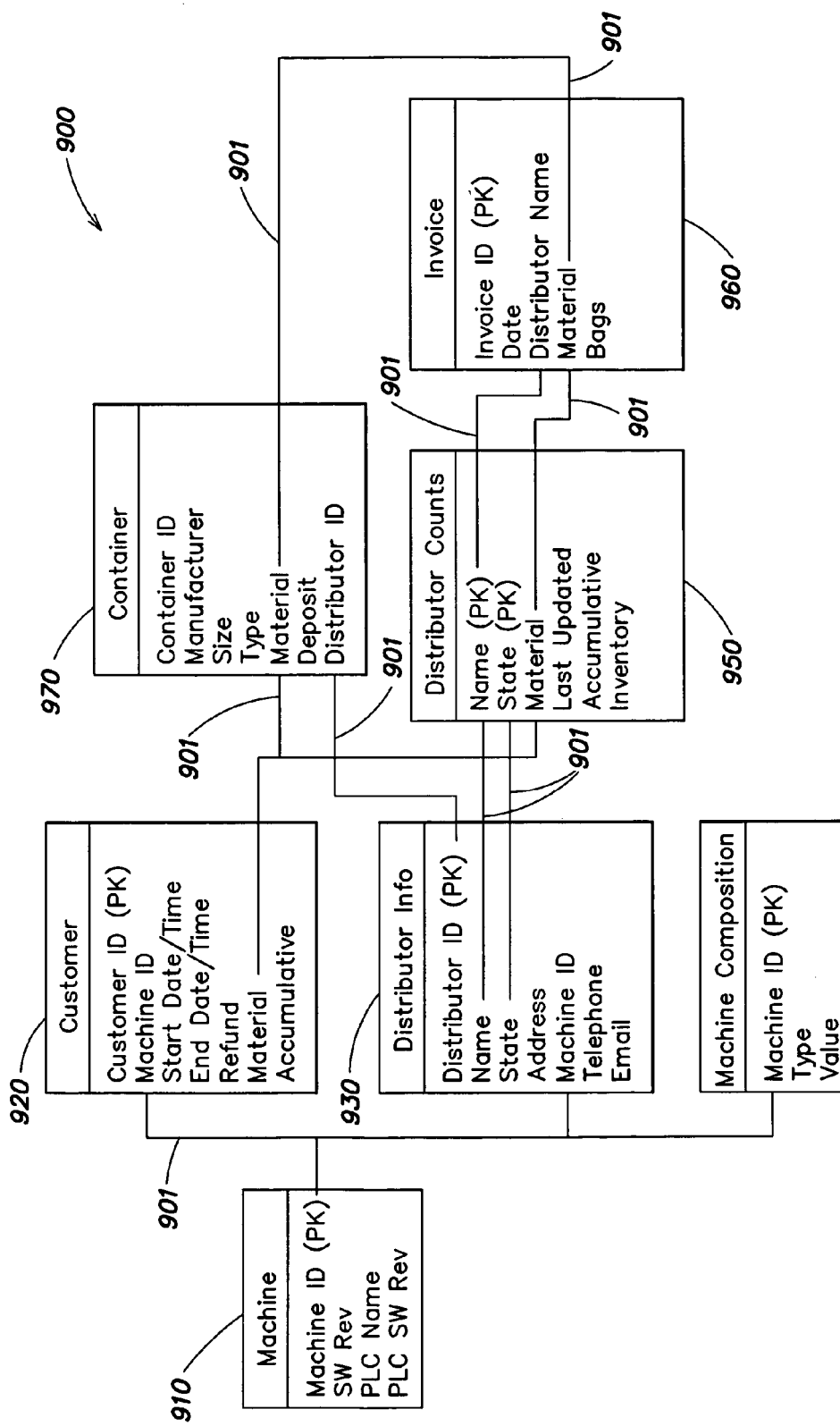
FIG. 9 depicts an exemplary data structure for storing information related to redemption activity and equipment, according to one embodiment of the invention.

The data structure 900 of FIG. 9 includes machine table 910, customer table 920, distributor information table 930, machine composition table 940, distributor counts table 950, invoice table 960 and container table 970. It should be appreciated that the data structure shown in FIG. 9 is merely an exemplary embodiment, and that any of numerous data structures may alternatively be employed. For example, an alternative data structure may include different tables, or no tables at all, if not a relational database.

Each of the tables shown in FIG. 9 contains a number of named columns, including one or more which are designated as the primary key (denoted with "(PK)"), meaning that the one or more columns stores a unique value in each table row.

Some of the columns in each table are logically associated with (i.e., have a foreign key to) a column in another table; this association is indicated by the arrows 901. A logical association may be established for any of numerous reasons, such as to maintain relational integrity between the tables. For example, the machine table 910 has a column which stores a machine ID for each event. This machine ID has a foreign key to the machine ID in the customer table 920 (among others), such that the customer table 920 may not store a machine ID that is not also stored in machine table 910. In this manner, consistency may be maintained between columns in various tables.

In the embodiment shown, machine table 910 stores information defining the software implemented on the machine (e.g., the software implemented by processor 250 and computer 260), customer table 920 stores information on one or more customers (e.g., a redemption center at which the machine is installed), distributor information table 930 stores information about particular distributors for which containers are processed and stored, machine composition table 940 stores information regarding the physical machine (e.g., its type and depreciated value), distributor counts table 950 stores information on the number and type of containers processed by the machine for each distributor, invoice table 960 stores information on invoices which maybe generated for reimbursement by a distributor for the processing of particular containers, and container table. However, any suitable information may be stored, as the invention is not limited in this respect.

In one embodiment, when a container is inspected in scanning station 240, information read from the container (e.g., provided by a bar code printed on its surface) is compared to information stored in container table 970. For example, scanning device 241 may communicate information which is read from container 200 to processor 250, which may then communicate information to computer 260 for comparison to table 970 in electronic file storage 261. For example, information read from container 200 by scanning device 241 may be communicated to computer 260 as a container ID, which may be compared by computer 260 to the container ID included in entries in table 970.

In one embodiment, if the container ID read from container 200 matches a container ID included in an entry in table 970, then container 200 is identified. Based on this identification, data in other columns in table 970 for the considered entry may be examined to determine the treatment of container 200 by the system. For example, data in other columns may be used to determine the densification device to which container 200 should be directed. For example, data in the "material" column may be examined to determine the material from which the container is made, which may determine the device to which container 200 is directed. As an example, if it is determined that the container is made of glass (i.e., the material column in table 970 contains an indication that the container corresponding to the considered container ID is made from glass), then container 200 may be directed to a glass crusher, such as device 600 shown in FIGS. 6A-6B. Container 200 may be directed to the device, for example, according to the techniques described above.

In one embodiment, when a container is recognized and processed by the system, accounting data related to the container may be updated in data structure 900. For example, data in the "distributor ID" column in the container table 970 may be examined and compared to the distributor ID column in the distributor information table 930 to obtain the distributor name and address information corresponding to the container. Using this information, data in the distributor counts table 950 and/or invoice table 960 may be updated. For example, data in the "accumulative" column in table 950 and/or the "bags" column in table 960 may be updated to reflect the receipt of container 200. As such, the system may store up-to-date accounting information related to the redemption activity for a known distributor.

In one embodiment, computer 260 may be equipped with one or more security features so that information stored in data structure 900 may not be modified (e.g., by an operator). For example, information stored in data structure 900 may be encrypted or stored in any other fashion which may dissuade tampering. As such, distributors may receive greater assurance that information received from a redemption center has not been modified fraudulently, such as to overstate the number or weight of containers processed.

In one embodiment, information may be transferred between one or more computers 260 and a central facility. In one example, information collected by systems at multiple redemption centers, such as those which are implemented throughout a geographic region, may be communicated to a central collection facility for consolidation. In another example, information such as programmed instructions may be transferred from the central facility to one or more of computers 260. An exemplary implementation of this arrangement is depicted in FIG. 10.

Figure 10:
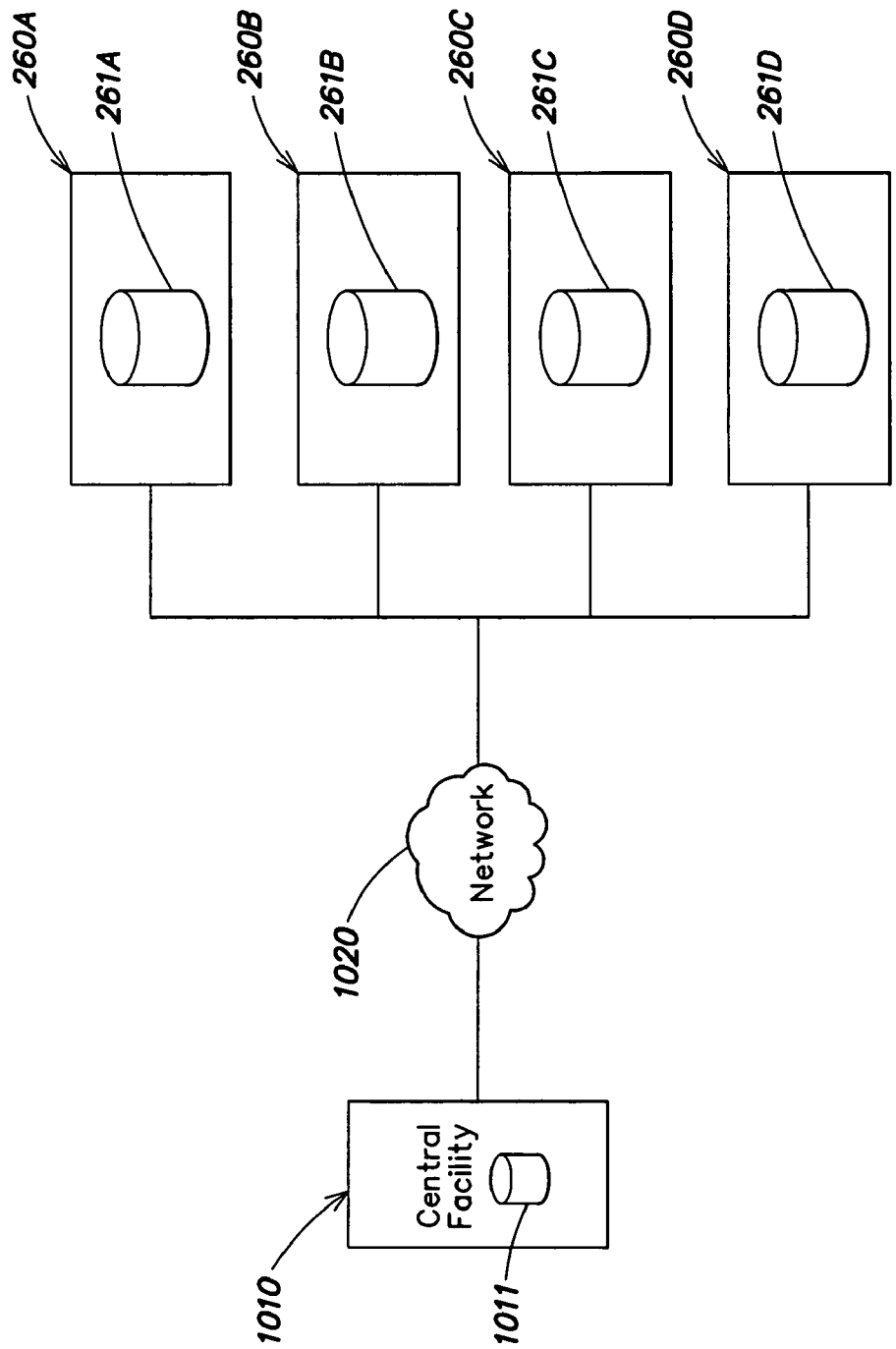
FIG. 10 is a block diagram showing a system used for communicating information related to redemption activity, according to one embodiment of the invention.

FIG. 10 includes central facility 1010, which maintains electronic file storage 1011. Central facility 1010 communicates with computers, 260A-260D via network 1020. Network 1020 may employ any suitable communications infrastructure and/or protocol(s). For example, network 1020 may include the Internet, a LAN, WAN, wireless network, or any combination thereof. In one embodiment, network 1020 may support bi-directional communication between central facility 1010 and any of computers 260, such that communication may be initiated by either of central facility 1010 or computer(s) 260.

Each of computers 260A-260D includes a respective electronic file storage 261A-261D. Each electronic file storage 261 may store information collected on redemption activity processed by a particular system, such as that which may be stored in data structure 900 (FIG. 9). Each of electronic file storage 261A-261D may also, or alternatively, store programmed instructions which may be executed, for example, to perform the processing techniques described above.

In one embodiment, information may be transferred between one or more of computers 260A-260D and central facility 1010. In one example, information on redemption activity may be uploaded from each of electronic file storage 261A-261D to electronic file storage 1011, so that activity occurring at multiple redemption facilities may be analyzed. For example, information related to a particular distributor captured at multiple redemption centers may be consolidated, and one or more reports may be generated from the information and delivered to the distributor. In another example, information may be downloaded from central facility 260 to one or more of computers 260A-260D. For example, central facility 1010 may periodically transfer software updates to each of computers 260A-260D for installation. Consequently, computers 260 may be more easily maintained.

In one embodiment, information related to redemption activity may be transferred to a transportable medium which may be used by a consumer for subsequent transactions, such as transactions with another business, thereby providing financial incentive for the consumer to redeem recyclable containers. For example, a redemption center may transfer information related to redemption activity to a computer-readable medium such as a credit or debit card, or a medium such as paper script. The medium may be used by the consumer to execute one or more subsequent transactions with one or more businesses, such as those which are business partners of the redemption center which issues the transportable medium. For example, an amount of deposit for containers returned by a consumer may be transferred to a debit card, and the consumer may then be credited for the amount of deposit when the consumer makes a purchase at a partner retail location such as a supermarket.

Figure 11:
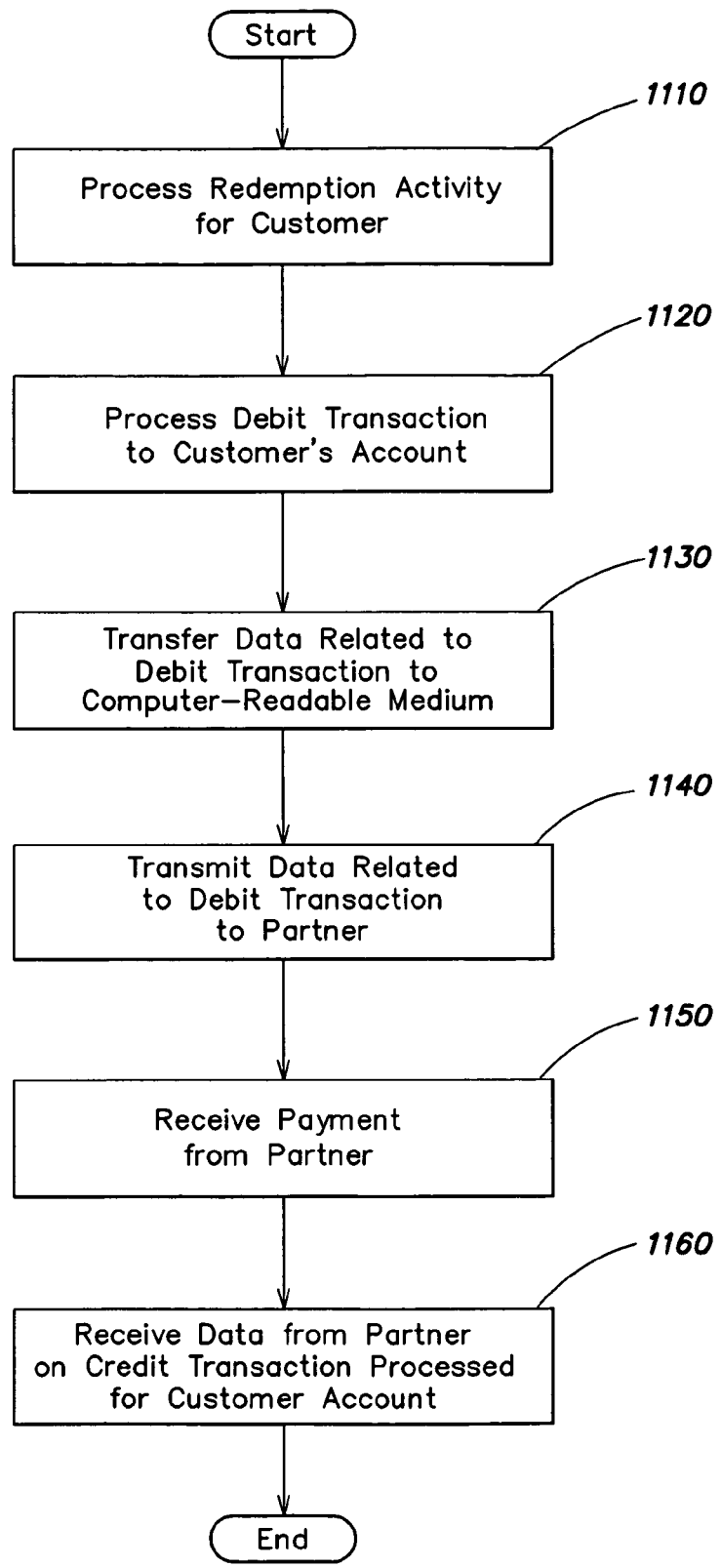
FIG. 11 is a flowchart showing a process for encouraging redemption activity by consumers, according to one embodiment of the invention.

An exemplary process for encouraging consumer redemption activity by transferring information related to that activity to a transportable medium is described with reference to FIG. 11. Upon the start of the process of FIG. 11, redemption activity is processed for a customer in act 1110. This may be performed, for example, according to the techniques described above, such that one or more containers brought by the customer to the redemption center are each conveyed to an appropriate densification device, and information on processed containers is stored electronically (e.g., in data structure 900, FIG. 9). However, the invention is not limited in this respect, as redemption activity may occur in any suitable manner.

Upon the completion of act 1110, the process proceeds to act 1120, wherein the redemption center processes a debit transaction to an account held by the customer. This may be performed in any of numerous ways. For example, debit transaction may be posted electronically to an account maintained by the customer with the redemption center and/or a business partner of the redemption center. Information on the customer account may be stored, for example, in electronic file storage (e.g., in computer 260).

Upon the completion of act 1120, the process proceeds to act 1130, wherein data related to the debit transaction is transferred to a transportable medium. As an example, the data may be transferred to a medium such as a debit card, credit card, "key card," paper script, or other suitable medium. If the data is transferred to a computer-readable medium, it may be stored, as an example, on a magnetic strip or the like. If transferred to paper, the data may be imprinted as a bar code or other coded information, or may simply be printed in alphanumeric text. The information may be suitable for reading by a computer (e.g., a bar code scanner or other scanning device) or human operator. Any suitable technique may be employed, as the invention is not limited to a particular implementation.

Upon the completion of act 1130, the process proceeds to act 1140, wherein data related to the debit transaction is transmitted to the business partner. The data may be transmitted to the business partner using any suitable technique, such as by sending a signal via a secure network. The data may help the business partner verify that the information encoded on the transportable medium is accurate when the customer presents the medium for cash or exchange. For example, when executing the transaction, the business partner may compare the information on the transportable medium to the information sent by the redemption center and stored electronically.

Upon the completion of act 1140, the process proceeds to act 1150, wherein payment is received by the redemption center from the business partner. In one embodiment, payment may be conditioned on a customer's presentation of the transportable medium for cash or exchange, and may be in full or partial satisfaction of the debit transaction processed by the redemption center. However, the invention is not limited in this respect, as any suitable reimbursement scheme may be implemented.

Upon the completion of act 1150, the process proceeds to act 1160, wherein information is received by the redemption center from the business partner related to one or more credit transactions processed for the customer account. The information may be for credit transactions which correspond to the debit transaction processed in act 1120. Receipt of this data from the business partner may allow the redemption center to gauge the success of efforts to encourage customers to redeem recyclable containers. For example, the data may allow the redemption center to measure the extent to which customers follow redemption activity with subsequent transactions with the business partner, providing an indication of whether customers find the transportable medium valuable and/or useful.

Upon the completion of act 1160, the process completes.

The above-described aspects of the present invention and exemplary embodiments thereof may be implemented in any of numerous ways. For example, any subset of the above-described features may be implemented in combination, as the invention is not limited to being wholly implemented.

Further, the above-discussed computer-implemented functionality may be implemented using hardware, software or a combination thereof. When implemented in software, the software code can be executed on any suitable processor or collection of processors, whether provided in a single computer or distributed among multiple computers. It should further be appreciated that any component or collection of components that perform the functions described above can be generically considered as one or more controllers or processors that control the above-discussed functions. The one or more controllers or processors can be implemented in numerous ways, such as with dedicated hardware, or with general purpose hardware that is programmed using microcode or software to perform their functions recited above.

In this respect, it should be appreciated that one implementation of the embodiments of the present invention comprises at least one computer-readable medium (e.g., a computer memory, a floppy disk, a compact disc, a tape, etc.) encoded with a computer program (i.e., a plurality of instructions), which, when executed on a processor, performs the above-discussed functions of the illustrative embodiments of the present invention. The computer-readable medium can be transportable such that the programs stored thereon can be loaded onto any computer system resource to implement the aspects of the present invention described herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer-readable medium, the computer-implemented processes may, during the course of their execution, receive input manually (e.g., from a user), in the manners described above. In particular, the processes may receive input from one or more GUIs. The GUI(s) may be implemented in any suitable manner, such as with a web browser or other interface. In this respect, the GUI(s) need not execute on a personal computer, and may execute on any suitably adapted device. Moreover, the computer-implemented processes may receive input from electronic processes, which may be provided without the active involvement of a human operator.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

What is claimed is:

1. In a system comprising a computer and an assembly in communication with the computer, the computer comprising an electronic file storage, a method for managing information related to a densification of a recyclable container, the method comprising:
   (A) determining, by the assembly, at least one characteristic of a recyclable container;
   (B) based upon the at least one characteristic, selecting a process by which the recyclable container should be densified; and
   (C) causing information related to the recyclable container to be stored in the electronic file storage.

2. The method of claim 1, wherein the information stored in the electronic file storage includes at least one of information on a material from which the recyclable container is made, a distributor with which the recyclable container is associated, and a date on which the recyclable container is densified by the assembly.

3. The method of claim 1, wherein the assembly further comprises a scanning device, and wherein the act (A) further comprises determining the at least one characteristic by comparing data gathered from the container by the scanning device with information stored in the electronic file storage.

4. The method of claim 3, wherein the scanning device is a bar code reader, and wherein the data gathered from the recyclable container includes bar code data.

5. The method of claim 1, wherein the act (C) further comprises causing the information to be stored in a database maintained in the electronic file storage.

6. The method of claim 1, wherein the system further comprises a plurality of computers which are each in communication with a corresponding assembly, a network, and a central facility which is in communication with each of the computers via the network, wherein the central facility maintains a central database, and wherein the method further comprises acts of:
 (D) receiving data from each computer at the central facility; and
 (E) upon the receipt of the data, storing the data in the central database.

7. The method of claim 6, wherein the data relates to recyclable containers processed by the assembly which corresponds to each computer.

8. The method of claim 6, wherein the method further comprises an act of:
 (D) generating a report from the data stored in the central database.

9. The method of claim 8, wherein the report includes data related to activity performed by the assembly which corresponds to each computer.

10. The method of claim 8, further comprising an act of:
 (E) delivering the report to a distributor.

11. At least one computer-readable medium encoded with instructions, which instructions, when executed in a system comprising a computer and an assembly in communication with the computer, the computer comprising an electronic file storage, perform a method for managing information related to a densification of a recyclable container, the method comprising:
 (A) determining, by the assembly, at least one characteristic of a recyclable container;
 (B) based upon the at least one characteristic, selecting a process by which the recyclable container should be densified; and
 (C) causing information related to the recyclable container to be stored in the electronic file storage.

12. The at least one computer-readable medium of claim 11, wherein the information stored in the electronic file storage includes at least one of information on a material from which the recyclable container is made, a distributor with which the recyclable container is associated, and a date on which the recyclable container is densified by the assembly.

13. The at least one computer-readable medium of claim 11, wherein the assembly further comprises a scanning device, and wherein the act (A) further comprises determining the at least one characteristic by comparing data gathered from the container by the scanning device with information stored in the electronic file storage.

14. The at least one computer-readable medium of claim 13, wherein the scanning device is a bar code reader, and wherein the data gathered from the recyclable container includes bar code data.

15. The at least one computer-readable medium of claim 11, wherein the act (C) further comprises causing the information to be stored in a database maintained in the electronic file storage.

16. The at least one computer-readable medium of claim 11, wherein the system further comprises a plurality of computers which are each in communication with a corresponding assembly, a network, and a central facility which is in communication with each of the computers via the network, wherein the central facility maintains a central database, and wherein the method further comprises acts of:
 (D) receiving data from each computer at the central facility; and
 (E) upon the receipt of the data, storing the data in the central database.

17. The at least one computer-readable medium of claim 16, wherein the data relates to recyclable containers processed by the assembly which corresponds to each computer.

18. The at least one computer-readable medium of claim 16, wherein the method further comprises an act of:
 (D) generating a report from the data stored in the central database.

19. The at least one computer-readable medium of claim 18, wherein the report includes data related to activity performed by the assembly which corresponds to each computer.

20. The at least one computer-readable medium of claim 18, further comprising an act of:
 (E) delivering the report to a distributor.

* * * * *